(12) United States Patent
Gueta et al.

(10) Patent No.: US 11,868,208 B1
(45) Date of Patent: Jan. 9, 2024

(54) SYSTEM, METHOD, AND COMPUTER PROGRAM FOR DEFECT RESOLUTION

(71) Applicant: Amdocs Development Limited, Limassol (CY)

(72) Inventors: Limor Gueta, Mabuim (IL); Itsik David, Petach Tiqwa (IL); Yossi Bitton, Kefar Saba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/752,636

(22) Filed: May 24, 2022

(51) Int. Cl.
*G06F 11/00* (2006.01)
*G06F 11/07* (2006.01)
*G06F 11/14* (2006.01)

(52) U.S. Cl.
CPC ...... *G06F 11/0793* (2013.01); *G06F 11/0751* (2013.01); *G06F 11/1476* (2013.01)

(58) Field of Classification Search
CPC ............ G06F 11/0709; G06F 11/0751; G06F 11/1476
USPC ...................................................... 714/1–57
See application file for complete search history.

(56) References Cited

U.S. PATENT DOCUMENTS

| | | | | |
|---|---|---|---|---|
| 8,204,498 B1* | 6/2012 | Smith | ................. | G06F 11/2294 455/425 |
| 11,625,309 B1* | 4/2023 | Chen | ................... | G06F 11/3075 714/37 |
| 11,675,646 B2* | 6/2023 | Gasthaus | ............ | G06F 11/0793 714/48 |
| 2010/0313073 A1* | 12/2010 | Leeb | ..................... | G06F 16/285 714/37 |
| 2011/0106734 A1* | 5/2011 | Boult | .................... | G06F 18/254 714/E11.02 |
| 2011/0119528 A1* | 5/2011 | Karlsson | ............. | G06F 11/1405 714/25 |
| 2015/0067410 A1* | 3/2015 | Kumar | .................. | G06F 11/004 714/47.3 |
| 2022/0108147 A1* | 4/2022 | Wan | ........................ | H04L 67/51 |
| 2022/0138058 A1* | 5/2022 | Govindarajan | ..... | G06F 11/1625 714/10 |
| 2022/0400121 A1* | 12/2022 | Han | ........................ | G06N 5/025 |
| 2023/0095634 A1* | 3/2023 | Muralidharan | ....... | G06F 11/301 714/57 |
| 2023/0096290 A1* | 3/2023 | Garapati | ................ | G06N 5/022 714/4.1 |
| 2023/0267072 A1* | 8/2023 | Dwivedi | ............. | G06F 11/3608 714/38.1 |

\* cited by examiner

*Primary Examiner* — Sarai E Butler
(74) *Attorney, Agent, or Firm* — Zilka-Kotab, P.C.

(57) ABSTRACT

As described herein, a system, method, and computer program are provided for defect resolution. Information associated with a defect detected in a computer system is received. The information is processed, using a first machine learning model, to predict a source of the defect. The information and the source of the defect are processed, using a second machine learning model, to predict one or more parameters for handling the defect. One or more actions are caused to be performed to resolve the defect, based on the predicted one or more parameters for handling the defect.

17 Claims, 6 Drawing Sheets

SYSTEM, METHOD, AND COMPUTER PROGRAM FOR DEFECT RESOLUTION

FIELD OF THE INVENTION

The present invention relates to handling defects detected in computer systems.

BACKGROUND

Defects can be detected in computer systems during testing or during production, but in any case associated with the execution of some piece of code in the computer system. A defect refers to an unintended functioning within the computer system, and may be caused by an issue in software and/or hardware. Typically, defects are detected as a result of an error being generated by the computer system or some other unintended behavior being exhibited in the computer system.

Many processes exist to detect and handle defects. However, since defects have many possible sources, there is generally a significant amount of time that must be spent just to identify the correct source, let alone to then fix the defect and rerun the relevant code. As a result of the amount of work involved in handling defects, some defects may escape detection and/or correction. In the case of defects detected during testing, any unaddressed defects will end up in production.

There is thus a need for addressing these and/or other issues associated with the prior art.

SUMMARY

As described herein, a system, method, and computer program are provided for defect resolution. Information associated with a defect detected in a computer system is received. The information is processed, using a first machine learning model, to predict a source of the defect. The information and the source of the defect are processed, using a second machine learning model, to predict one or more parameters for handling the defect. One or more actions are caused to be performed to resolve the defect, based on the predicted one or more parameters for handling the defect.

DETAILED DESCRIPTION

Figure 1:
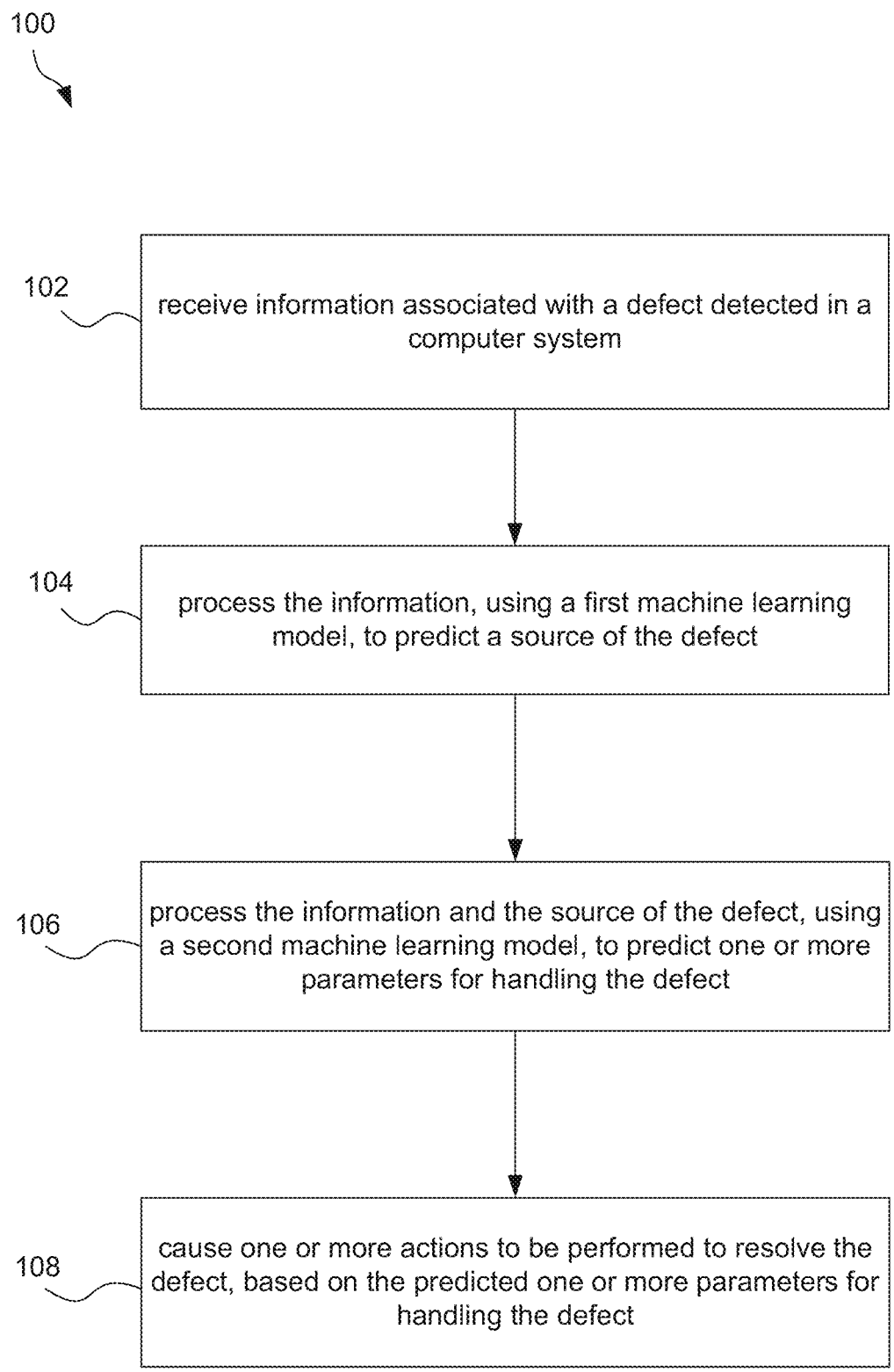
FIG. 1 illustrates a method for defect resolution, in accordance with one embodiment.

FIG. 1 illustrates a method for defect resolution, in accordance with one embodiment. The method 100 may be performed by any computer system(s) described below with respect to FIGS. 5 and/or 6. In one example described herein, the method 100 may be performed in the cloud, for example by one or microservices configured to provide defect resolution, as described herein.

In operation 102, information associated with a defect detected in a computer system is received. The "defect" refers to an unintended functioning within the computer system, which may be caused by an issue in software and/or hardware. In one embodiment, the defect may be detected as an error. For example, the defect may be detected when the computer system outputs an error. In an exemplary implementation, the error may occur during a testing automation flow, which may be executed to test code within the computer system). Of course, as another option, the error may occur during normal execution of the code within the computer system.

The information that is received in association with the defect may include any type of information that is capable of being used to resolve the defect. In one embodiment, the information may include a description (e.g. textual description, category, etc.) of the defect. In another embodiment, the information may include a log associated with detection of the defect. In yet another embodiment, the information may include a screenshot associated with detection of the defect.

It should be noted that the information associated with the defect may be received from any entity that detected the defect. For example, the information may be received from the same or different computer system, or even a service, that is operates to detect defects (e.g. via testing).

In operation 104, the information is processed, using a first machine learning model, to predict a source of the defect. The first machine learning model refers to a model (e.g. regression model) that has been trained using a machine learning algorithm to make predictions of a defect source. The first machine learning model may be trained using training data that includes historical information for resolved defects. Accordingly, the information associated with the defect may be input to the first machine learning model, which may then process the input to output a prediction of the source of the defect.

The source of the defect refers to any area of the computer system in which the defect occurred, such as environmental, data, functional, or maintenance. For example, the source may refer to a part of the code in which the defect occurred. In one embodiment, the first machine learning model may classify the source of the defect from among a plurality of classifications that include: environmental, data, functional, and maintenance.

In operation 106, the information and the source of the defect are processed, using a second machine learning model, to predict one or more parameters for handling the defect. The second machine learning model refers to a model that has been trained using a machine learning algorithm to make predictions of defect handling parameters. The second machine learning model may be trained using training data that includes the historical information for resolved defects. Accordingly, the source of the defect, and possibly any of the information associated with the defect, may be input to the second machine learning model, which may then process the input to output a prediction of the one or more parameters for handling the defect.

The parameters for handling the defect refer to any indicators that specify how the defect is to be handled (e.g. how the defect is to be automatically resolved). In one embodiment, the one or more parameters for handling the defect may include a microservice to be used for handling the defect. In another embodiment, the one or more parameters for handling the defect may include a healing function to execute for handling the defect. Accordingly, the second machine learning model may classify the one or more parameters for handling the defect from among a plurality of classifications that include different microservices and/or different handling functions.

For example, when the source of the defect is environmental, the parameters may indicate a different environment topology in which the code should be executed. As another example, when the source of the defect is data, the parameters may indicate a different data type on which the code should be executed. As yet another example, when the source of the defect is functional, the parameters may indicate a different business process flow to be used in association with the code. As still yet another example, when the source of the defect is maintenance, the parameters may indicate to perform automatic learning to update automation scripts.

In operation 106, one or more actions are caused to be performed to resolve the defect, based on the predicted one or more parameters for handling the defect. The actions refer to any functions preconfigured for resolving defects. For example, the actions may be performed by one of the different microservices and/or different handling functions specified by the parameters predicted for the defect.

To this end, in one embodiment, the one or more actions to resolve the defect may include executing a healing function specified by the one or more parameters. In one embodiment, the healing function may be deployed to the environment in which the defect was detected. As an option, the method 100 may also include re-executing the code in which the defect was detected, after performing the one or more actions to resolve the defect. This re-execution may ensure that the defect has been resolved (i.e. is not subsequently detected).

In an embodiment, the method 100 may include performing the one or more actions to resolve the defect. In another embodiment, the method 100 may include causing another entity to perform the one or more actions to resolve the defect. Such other entity may be a different computer system, or even a service, that is operates to resolve defects. In any case, the actions may be automatically determined based on the predicted parameters and the actions in turn may be automatically performed to resolve the defect in an automated manner (i.e. without human intervention).

The method 100 described herein may reduce the amount of work involved in handling defects by utilizing machine learning models that are able to predict both the defect source and resolution parameters for use in resolving the defect. Further, reducing the amount of work may eliminate any defects from going unaddressed, and therefore may prevent any defects from ending up in production of the code (particularly where the defects are detected during testing of the code).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
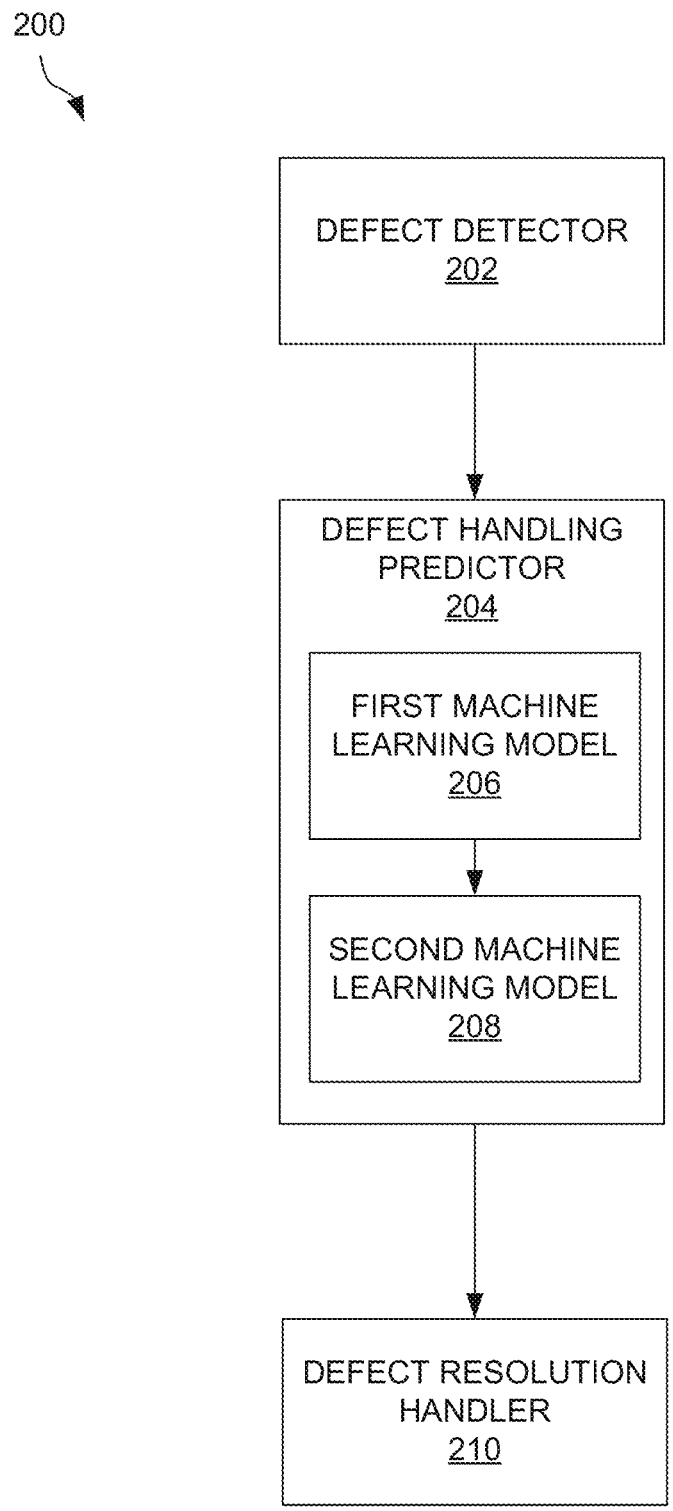
FIG. 2 illustrates a flow diagram of a system for defect resolution, in accordance with one embodiment.

FIG. 2 illustrates a flow diagram of a system 200 for defect resolution, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a defect detector 202 interfaces a defect handling predictor 204 which in turn interfaces a defect resolution handler 206. Each of these components 202-206 may be implemented in separate computer systems, one or more of the same computer system, as separate services (e.g. microservices), in one or more of the same services, or any combination thereof.

The defect detector 202 operates to detect defects in computer systems. The defect detector 202 may be configured to detect defects during normal code execution. As another option, the defect detector 202 may perform testing of code to detect defects. The defect detector 202 gathers information associated with any detected defect, such as a description of the defect, a log of the defect, a screenshot associated with the defect, etc.

The defect handling predictor 204 operates to predict parameters for handling defects detected by the defect detector 202. The defect handling predictor 204 receives the information associated with a detected defect from the defect detector 202, and processes the information using a first machine learning model 206 and a second machine learning model 208 to predict the parameters. In particular, the first machine learning model 206 processes the information to predict a source of the defect, and then the second machine learning model 208 processes the source of the defect and optionally any of the information to predict parameters for handling defect.

The defect handling predictor 204 may initially train the first machine learning model 206 and the second machine learning model 208 to make the aforementioned predictions. The defect handling predictor 204 may also periodically re-train the first machine learning model 206 and the second machine learning model 208 when new data for resolved defects is available for use as training data. This re-training may improve the accuracy of the first machine learning model 206 and the second machine learning model 208.

The defect resolution handler 210 operates to perform actions to resolve the defects detected by the defect detector 202. The actions may be performed by executing microservices and/or self-healing functions that are configured to resolve the defects. In any case, the defect resolution handler 210 resolves a defect by performing one or more actions that are determined based on the parameters predicted by the defect handling predictor 204. In other words, in response to the defect resolution handler 210 receiving, from the defect handling predictor 204, parameters predicted for a defect, the defect resolution handler 210 may determine one or more actions that correspond to those parameters and may then perform those actions to resolve the defect.

Figure 3:
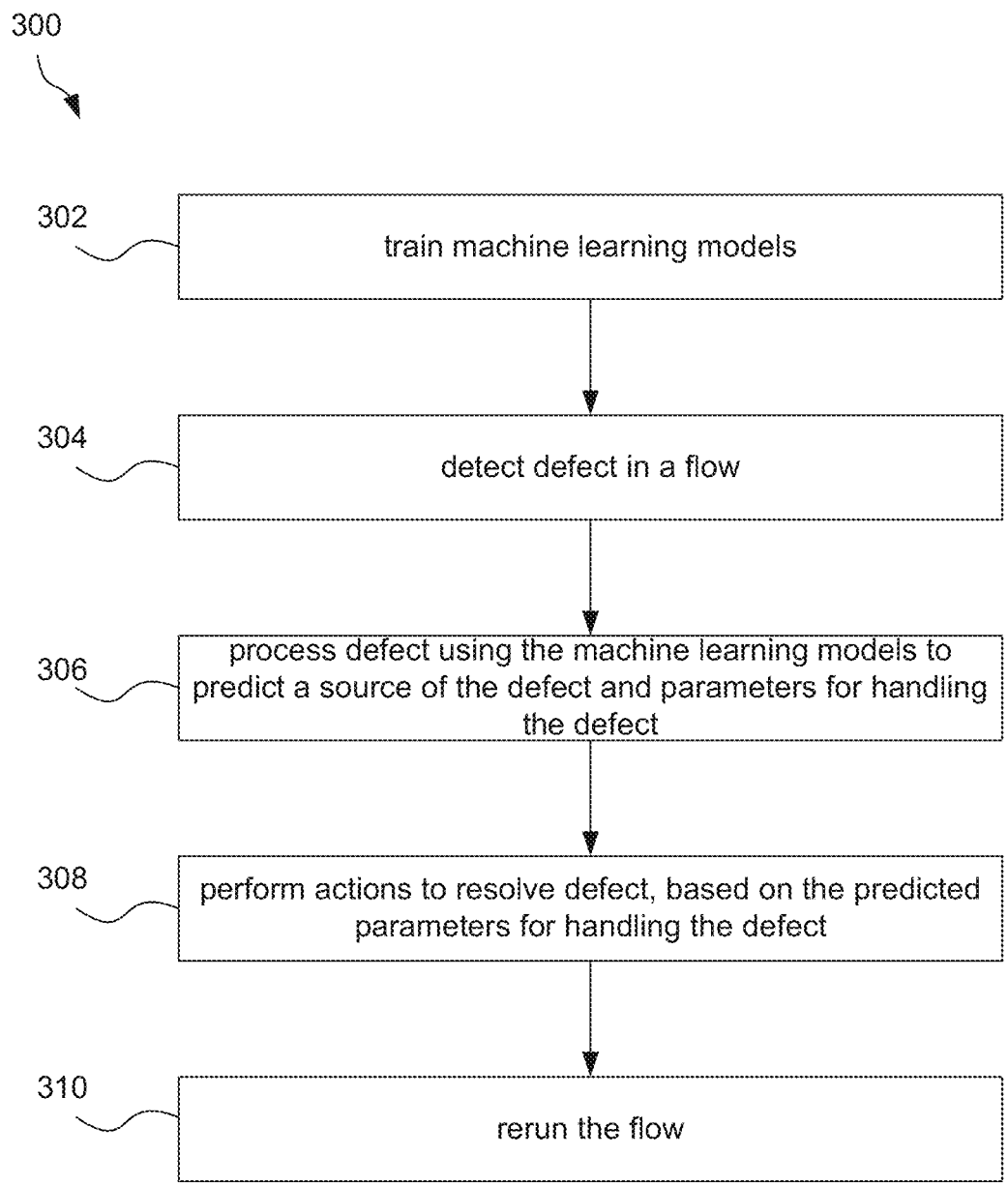
FIG. 3 illustrates a method for providing self-healing of defects, in accordance with one embodiment.

FIG. 3 illustrates a method 300 for providing self-healing of defects, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

In operation 302, machine learning models are trained. With respect to operation 302, a first machine learning model (e.g. item 206 of FIG. 2) is trained to make predictions of defect source and a second machine learning model (e.g. item 208 of FIG. 2) is trained to make predictions of defect handling parameters. The machine learning models may be trained using training data that includes historical information for resolved defects. As an option, the historical information may be cleaned and normalized using natural language processing (NLP) to build a tokenized dictionary. In one embodiment, the first machine learning model may be a regression model.

In operation 304, a defect is detected in a flow. The flow refers to an execution flow for code. The defect may be detected by an error thrown during the execution of the code.

In operation 306, the defect is processed using the machine learning models to predict a source of the defects and parameters for handling the defect. In particular, the first machine learning model processes information associated with the defect to predict the source of the defect and the second machine learning model processes the source of the defect to predict the parameters for handling the defect.

In operation 308, actions are performed to resolve the defect, based on the predicted parameters for handling the defect. In other words, the defect is resolved in accordance with the predicted parameters for handling the defect. The defect may be resolved by correcting the code in which the defect occurred.

In operation 310, the flow is rerun (i.e. the code is re-executed). It may then be verified that the defect was in fact resolved by the actions corresponding to the predicted parameters. If the defect is determined to not be resolved, as a result of rerunning the flow, an alert may be provided to a team that developed the portion of the code in which the defect was detected (i.e. the source of the defect). If the defect is determined to be resolved, as a result of rerunning the flow, the method 300 may end with regard to that defect.

Figure 4:
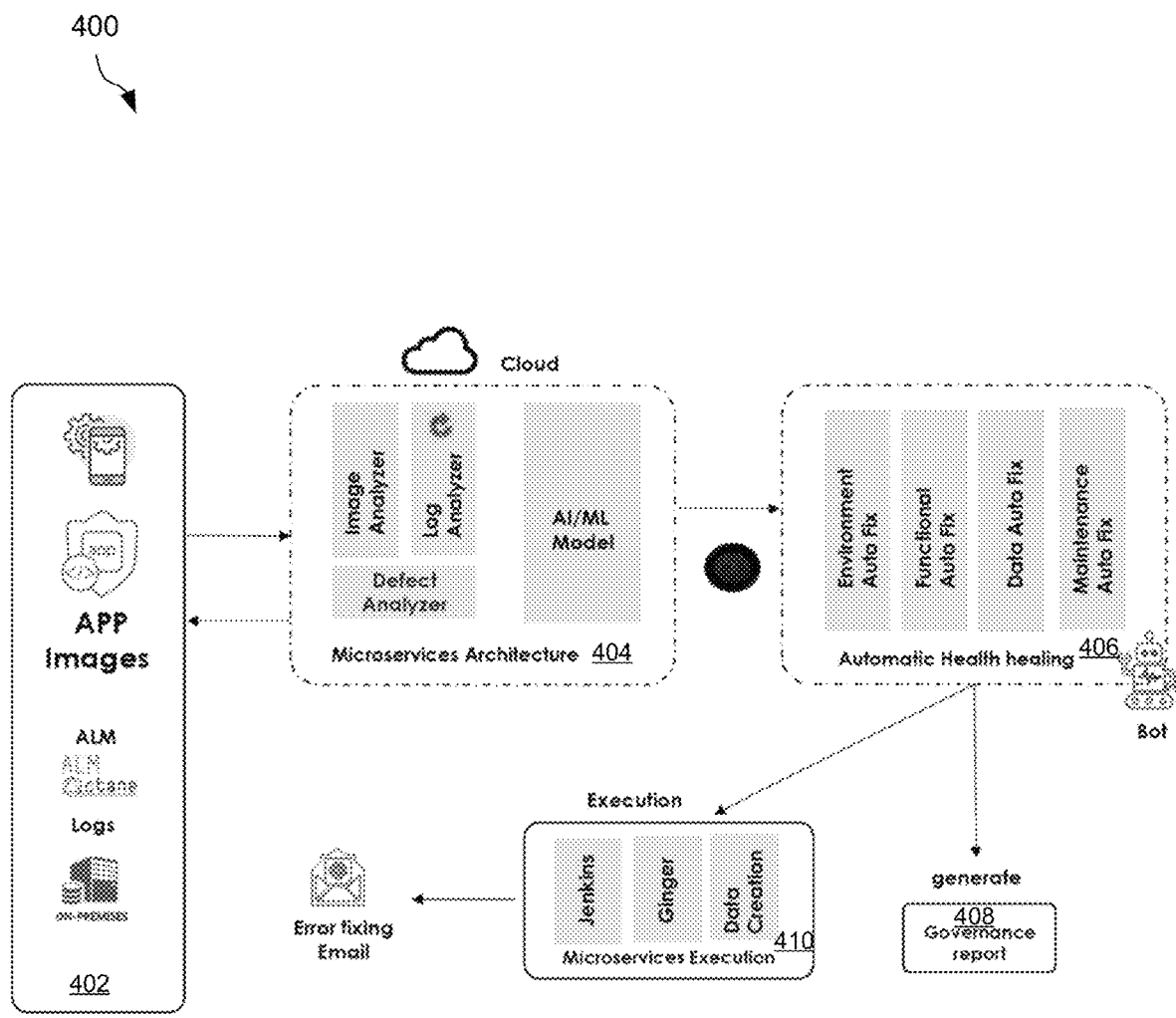
FIG. 4 illustrates a flow diagram of a system for providing self-healing of defects, in accordance with one embodiment.

FIG. 4 illustrates a flow diagram of a system 400 for providing self-healing of defects, in accordance with one embodiment. As an option, the system 400 may be implemented in the context of the details of the previous figure and/or any subsequent figure(s). Of course, however, the system 400 may be implemented in the context of any desired environment. Further, the aforementioned definitions may equally apply to the description below.

Information 402 associated with a detected defect is collected. The information can include application images, testing logs, etc. A microservices architecture 404 analyzes the information using machine learning models (AI/ML models) to predict a source of the defect and parameters for handling the defect. An automatic health healing component 406 (shown as a bot) determines an automatic fix for the defect, based on the parameters for handling the defect. The parameters may indicate which preconfigured automatic fix is to be implemented for resolving the defect.

A governance report 408 may be generated for the defect. Further, a microservices execution 410 of the automatic fix may be performed. Once the automatic fix has been implemented by the microservices execution 410, an email may be sent to the relevant development team with information about the defect and the implementation of the automatic fix for the defect.

Figure 5:
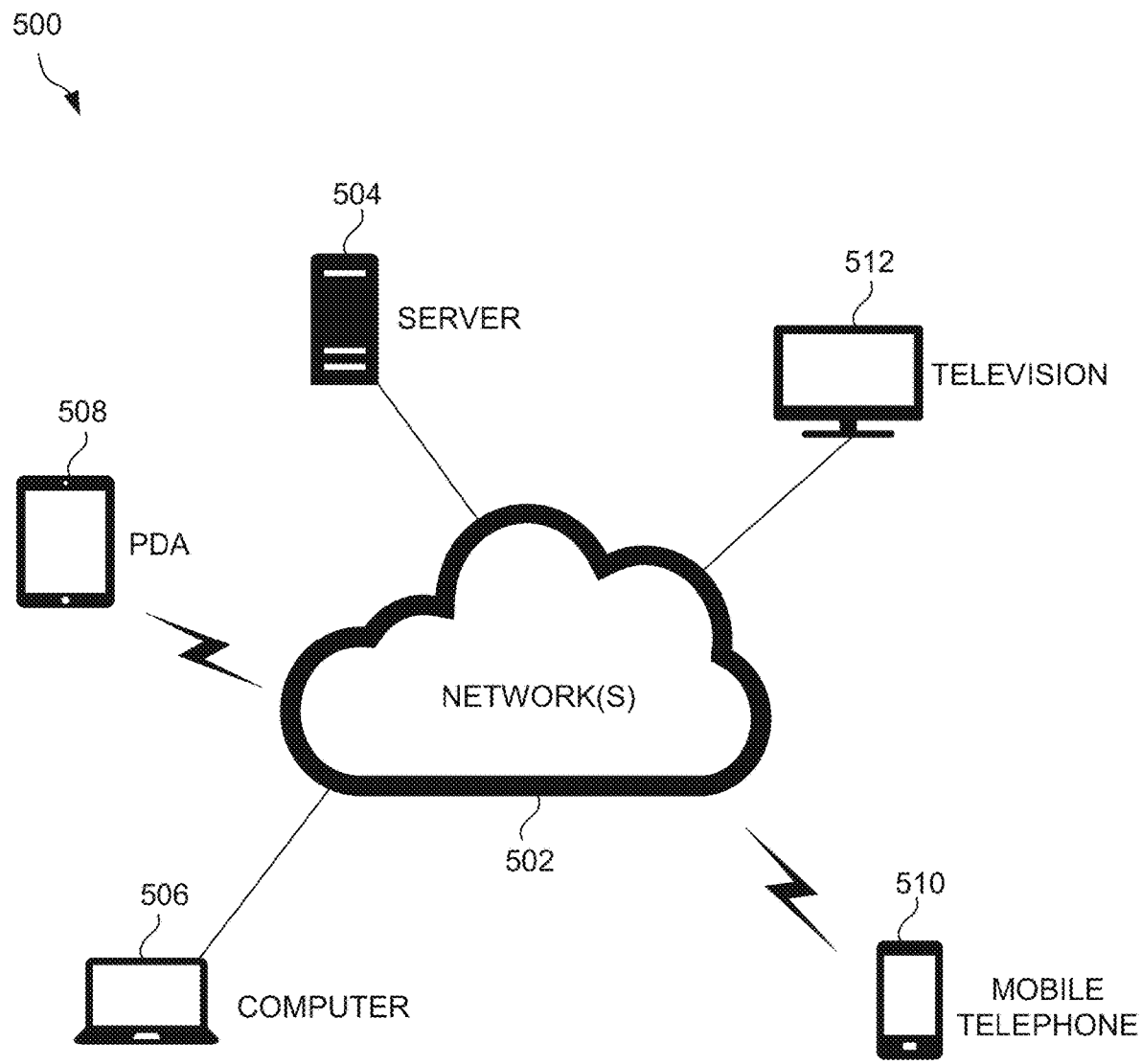
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
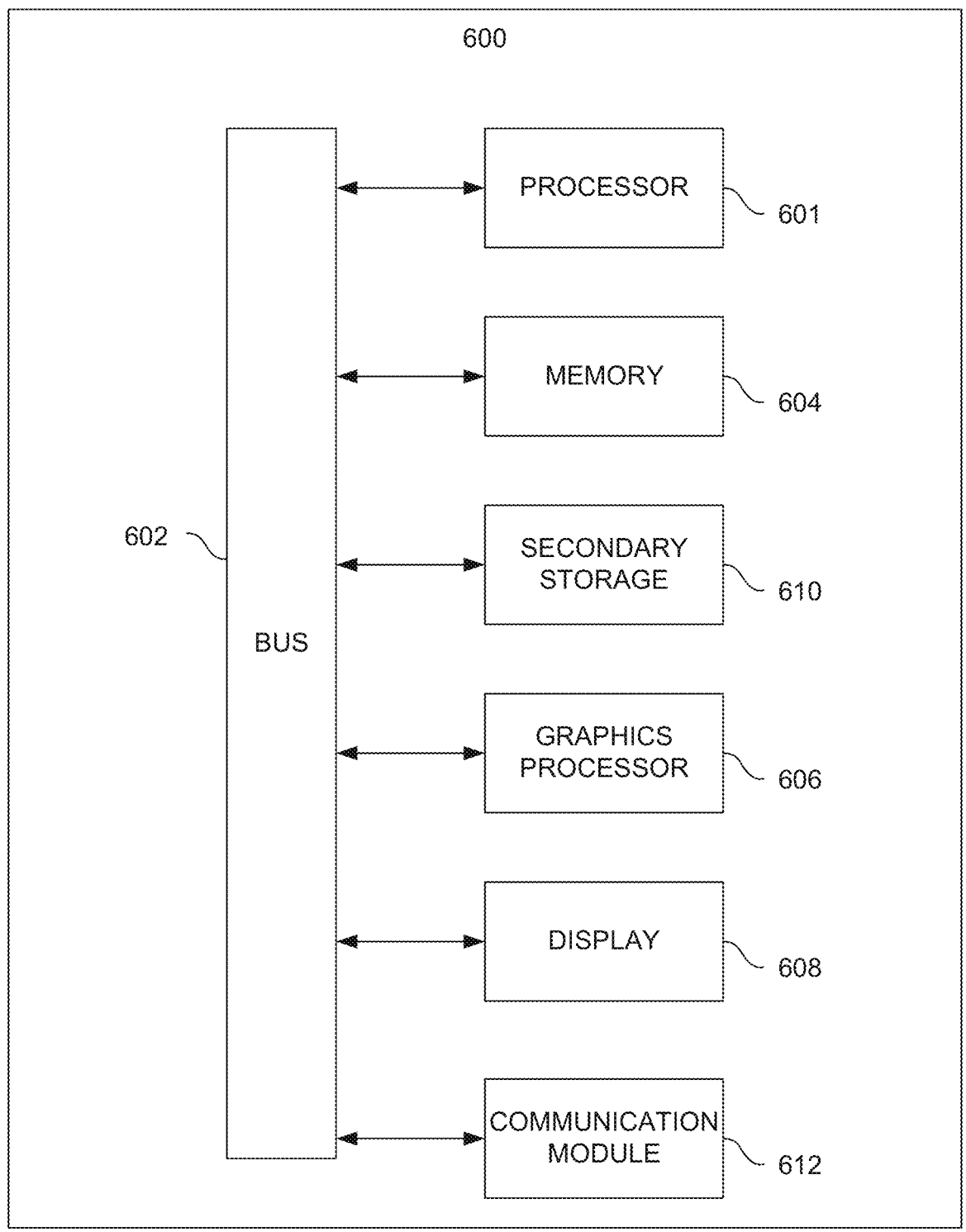
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    detect an error output by a computer system during execution of code within the computer system, wherein the error is indicative of a defect within the code;
    in response to detecting the error, receive information describing the defect;
    process the information, using a first machine learning model, to predict a source of the defect, wherein the source is a part of the code in which the defect occurred;
    process the information and an identifier of the source of the defect, using a second machine learning model, to predict one or more parameters for handling the defect, wherein the second machine learning model predicts the one or more parameters for handling the defect from among a plurality of classifications that include different microservices and different handling functions; and
    cause one or more actions to be performed to resolve the defect, using the predicted one or more parameters for handling the defect.

2. The non-transitory computer-readable media of claim 1, wherein the error occurs during a testing automation flow being executed to test the code.

3. The non-transitory computer-readable media of claim 1, wherein the information includes a log associated with the defect.

4. The non-transitory computer-readable media of claim 1, wherein the information includes a screenshot associated with the defect.

5. The non-transitory computer-readable media of claim 1, wherein the first machine learning model classifies the source of the defect from among a plurality of classifications that include:
    environmental, data,
functional, and
maintenance.

6. The non-transitory computer-readable media of claim 5, wherein when the source of the defect is environmental, the one or more parameters indicate a different environment topology in which the code should be executed.

7. The non-transitory computer-readable media of claim 5, wherein when the source of the defect is data, the one or more parameters indicate a different data type on which the code should be executed.

8. The non-transitory computer-readable media of claim 5, wherein when the source of the defect is functional, the one or more parameters indicate a different business process flow to be used in association with the code.

9. The non-transitory computer-readable media of claim 5, wherein when the source of the defect is maintenance, the one or more parameters indicate to perform automatic learning to update automation scripts.

10. The non-transitory computer-readable media of claim 1, wherein handling the defect includes automatically resolving the defect.

11. The non-transitory computer-readable media of claim 1, wherein the device is further caused to:
train the first machine learning model to make predictions of defect source, and
train the second machine learning model to make predictions of defect handling parameters.

12. The non-transitory computer-readable media of claim 11, wherein the first machine learning model and the second machine learning model are trained using training data that includes historical information for resolved defects.

13. The non-transitory computer-readable media of claim 1, wherein the first machine learning model is a regression model.

14. The non-transitory computer-readable media of claim 1, wherein the device is further caused to:
re-execute code in which the defect was detected, after performing the one or more actions to resolve the defect, to ensure that the defect has been resolved.

15. The non-transitory computer-readable media of claim 1, wherein the one or more actions are performed by one of the different microservices or one of the different handling functions specified in the one or more parameters.

16. A method, comprising:
at a computer system:
detecting an error output by a computer system during execution of code within the computer system, wherein the error is indicative of a defect within the code;
in response to detecting the error, receiving information describing the defect;
processing the information, using a first machine learning model, to predict a source of the defect, wherein the source is a part of the code in which the defect occurred;
processing the information and an identifier of the source of the defect, using a second machine learning model, to predict one or more parameters for handling the defect, wherein the second machine learning model predicts the one or more parameters for handling the defect from among a plurality of classifications that include different microservices and different handling functions; and
causing one or more actions to be performed to resolve the defect, using the predicted one or more parameters for handling the defect.

17. A system, comprising:
a non-transitory memory storing instructions; and
one or more processors in communication with the non-transitory memory that execute the instructions to:
detect an error output by a computer system during execution of code within the computer system, wherein the error is indicative of a defect within the code;
in response to detecting the error, receive information describing the defect;
process the information, using a first machine learning model, to predict a source of the defect, wherein the source is a part of the code in which the defect occurred;
process the information and an identifier of the source of the defect, using a second machine learning model, to predict one or more parameters for handling the defect, wherein the second machine learning model predicts the one or more parameters for handling the defect from among a plurality of classifications that include different microservices and different handling functions; and
cause one or more actions to be performed to resolve the defect, using the predicted one or more parameters for handling the defect.

* * * * *